United States Patent
Dudzinski et al.

(10) Patent No.: US 10,476,724 B2
(45) Date of Patent: Nov. 12, 2019

(54) SCANNING IN A WIRELESS NETWORK

(71) Applicant: AIRSPAN NETWORKS INC., Boca Raton, FL (US)

(72) Inventors: Krzysztof Dudzinski, Berkshire (GB); Martin Lysejko, Surrey (GB); Alan Carter, Bath (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 0 days.

(21) Appl. No.: 16/026,257

(22) Filed: Jul. 3, 2018

(65) Prior Publication Data

US 2019/0013988 A1      Jan. 10, 2019

(30) Foreign Application Priority Data

Jul. 6, 2017   (GB) .................................. 1710867.1

(51) Int. Cl.
*H04L 27/28*   (2006.01)
*H04L 27/26*   (2006.01)
(Continued)

(52) U.S. Cl.
CPC ......... *H04L 27/2659* (2013.01); *H04B 7/088* (2013.01); *H04B 7/0842* (2013.01);
(Continued)

(58) Field of Classification Search
CPC . H04L 27/2659; H04L 27/266; H04B 17/318; H04B 7/0842; H04B 17/345; H04B 17/336; H04B 7/088; H04B 7/0837; H04W 36/30
USPC ........................................ 375/260; 455/426.1
See application file for complete search history.

(56) References Cited

U.S. PATENT DOCUMENTS 10,045,197 B1 *  8/2018  Abdallah ............... H04W 8/005
2005/0176468 A1 *  8/2005  Iacono ................. H04B 7/0689
                                                    455/562.1
(Continued)

FOREIGN PATENT DOCUMENTS

EP          2557701 A2    2/2013
EP          3178171 A2    6/2017
(Continued)

OTHER PUBLICATIONS

PCT Search Report and Written Opinion from PCT/GB208/051876 dated Sep. 12, 2018, 16 pages.
(Continued)

*Primary Examiner* — Don N Vo
(74) *Attorney, Agent, or Firm* — Haynes Beffel & Wolfeld LLP; Andrew L. Dunlap

(57) ABSTRACT

There is provided a node for operating in a wireless network, including: coarse-granularity scanning circuitry that performs a coarse-granularity scanning process to detect one or more donor nodes of the wireless network according to a first metric. Connection circuitry forms a connection to a selected donor node in the one or more donor nodes. The connection is broken as a consequence of the coarse-granularity scanning process being performed. Fine granularity scanning circuitry performs a fine granularity scanning process to determine a configuration in which a quality of the connection is improved according to a second metric. The connection is maintained during the fine granularity scanning process.

33 Claims, 9 Drawing Sheets

(51) Int. Cl.
    *H04B 7/08*          (2006.01)
    *H04W 36/30*       (2009.01)
    *H04B 17/318*      (2015.01)
    *H04B 17/336*      (2015.01)
    *H04B 17/345*      (2015.01)

(52) U.S. Cl.
    CPC ......... *H04B 17/318* (2015.01); *H04B 17/336* (2015.01); *H04B 17/345* (2015.01); *H04L 27/266* (2013.01); *H04W 36/30* (2013.01); *H04B 7/0837* (2013.01)

(56) References Cited

U.S. PATENT DOCUMENTS

2007/0135167 A1\*   6/2007   Liu ..................... H01Q 3/2617
                                                    455/562.1
2010/0302101 A1   12/2010  Leiba et al.
2012/0069800 A1\*   3/2012   Soliman ................ H04W 48/08
                                                    370/329
2018/0367844 A1\*  12/2018  Fu ...................... H04N 21/4424

FOREIGN PATENT DOCUMENTS

WO      2016178208 A2   11/2016
WO      2016178208 A3   12/2016

OTHER PUBLICATIONS

PCT Written Opinion of the IPER from PCT/GB2018/051876 dated Jun. 14, 2019, 7 pages.
PCT IPRP from PCT/GB208/051876 dated Sep. 10, 2019, 20 pages.

\* cited by examiner

| Reading | SINR | RSRP | y[n] SINR | y[n] RSRP | Normalised SINR | Normalised RSRP | Weighted N SINR | Weighted N RSRP | DRM |
|---|---|---|---|---|---|---|---|---|---|
| 1 | -2 | -103 | -2 | -103 | | | | | |
| 2 | 5 | -105 | -0.31 | -103.48 | | | | | |
| 3 | 7 | -104 | 1.46 | -103.61 | | | | | |
| 4 | 6 | -103 | 2.56 | -103.46 | | | | | |
| 5 | 1 | -103 | 2.18 | -103.35 | 0.205 | 0.333 | 0.062 | 0.233 | 0.295 |
| num_samples = 5 | | | | | | | | | |
| settling_level = 0.75 | | | | | | | | | |
| alpha = 1 - 0.25^0.2 = 0.2421 | | | | | | | | | |
| 1-alpha = 0.7579 | | | | | | | | | |
| SINR Min = -5 | | | | | | | | | |
| SINR Max = 30 | | | | | | | | | |
| RSRP Min = -130 | | | | | | | | | |
| RSRP Max = -50 | | | | | | | | | |
| SINR Weight = 0.3 | | | | | | | | | |
| RSRP Weight = 0.7 | | | | | | | | | |

FIG. 5

SCANNING IN A WIRELESS NETWORK

CROSS-REFERENCE TO OTHER APPLICATIONS

This application claims priority under 35 U.S.C. 119(b) to UK Application No. 1710867.1, filed 6 Jul. 2017, which application is incorporated by reference herein.

BACKGROUND

The present technique relates to wireless networks.

Typically when a node is to join a wireless network, the main priority is in establishing a good connection to that network. Such a connection might be achieved by scanning for available donor nodes and then selecting the best of those available donor nodes according to some metric (typically Signal-to-interference-and-noise-ratio SINR). It would be desirable to improve the quality of a connection to a selected donor node if possible. Furthermore, although typical measurements for wireless networks such as SINR can give a good indication as to the quality of different connections, they are not suitable for optimising a given connection due to their variance. It would therefore also be desirable to determine a metric suitable for optimising a wireless connection.

Viewed from a first example configuration, there is provided a node configured to operate in a wireless network, comprising: coarse-granularity scanning circuitry to perform a coarse-granularity scanning process to detect one or more donor nodes of the wireless network according to a first metric; connection circuitry to form a connection to a selected donor node in the one or more donor nodes, wherein the connection is broken as a consequence of the coarse-granularity scanning process being performed; and fine granularity scanning circuitry to perform a fine granularity scanning process to determine a configuration in which a quality of the connection is improved according to a second metric, wherein the connection is maintained during the fine granularity scanning process.

Viewed from a second example configuration, there is provided a method of operating a node in a wireless network, comprising: performing a coarse-granularity scanning process to detect one or more donor nodes of the wireless network according to a first metric; forming a connection to a selected donor node in the one or more donor nodes, wherein the connection is broken as a consequence of the coarse-granularity scanning process being performed; and performing a fine granularity scanning process to determine a configuration in which a quality of the connection is improved according to a second metric, wherein the connection is maintained during the fine granularity scanning process.

Viewed from a third example configuration, there is provided a node configured to operate in a wireless network, comprising: means for performing a coarse-granularity scanning process to detect one or more donor nodes of the wireless network according to a first metric; means for forming a connection to a selected donor node in the one or more donor nodes, wherein the connection is broken as a consequence of the coarse-granularity scanning process being performed; and means for performing a fine granularity scanning process to determine a configuration in which a quality of the connection is improved according to a second metric, wherein the connection is maintained during the fine granularity scanning process.

The present technique will be described further, by way of example only, with reference to embodiments thereof as illustrated in the accompanying drawings, in which:

FIG. 1 illustrates a wireless network comprising a number of donor nodes;

FIG. 2 schematically illustrates the node in accordance with some embodiments;

FIG. 5 shows a worked example of calculating DRM in accordance with some embodiments;

Figure 1:
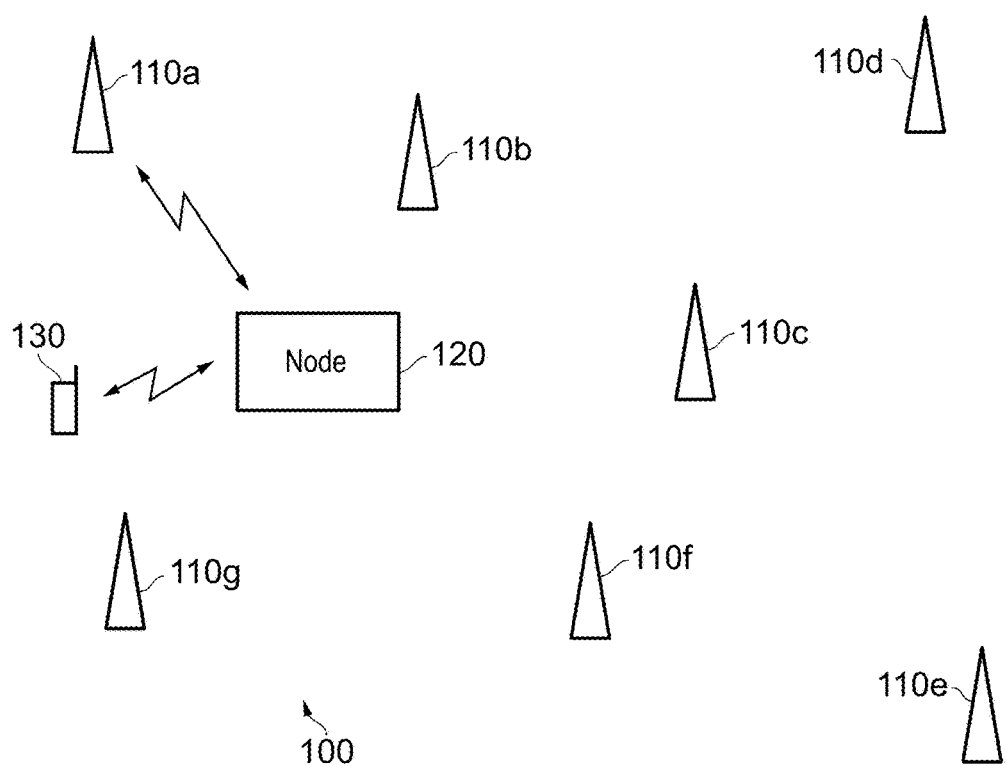

Before discussing the embodiments with reference to the accompanying figures, the following description of embodiments and associated advantages is provided.

In accordance with one example configuration there is provided a node configured to operate in a wireless network, comprising: coarse-granularity scanning circuitry to perform a coarse-granularity scanning process to detect one or more donor nodes of the wireless network according to a first metric; connection circuitry to form a connection to a selected donor node in the one or more donor nodes, wherein the connection is broken as a consequence of the coarse-granularity scanning process being performed; and fine granularity scanning circuitry to perform a fine granularity scanning process to determine a configuration in which a quality of the connection is improved according to a second metric, wherein the connection is maintained during the fine granularity scanning process.

A connection is initially formed on the basis of the coarse-granularity scanning process. This can involve determining, in a short period of time, available donor nodes in the network and determining which of those donor nodes is the best for the formation of an initial connection. This occurs with reference to a first metric. The coarse-granularity scanning process initially breaks any connection that has initially been formed. Breaking existing connections helps to provide a "clean" scanning process that is substantially unaffected by other connections. Having broken existing connections, the coarse-granularity scanning process involve rotating an antenna through 360 degrees. The fine granularity scanning process, on the contrary, is one that can be performed once a connection has been formed. For example, when using a directional antenna with rotation, the rotation could be limited to occurring in a range where the connection can be maintained. As a consequence of the connection not being intentionally broken during the fine-granularity scanning process, the fine granularity scanning process can be performed over a longer period of time, in order to obtain a greater quantity of data and thereby improve the connection according to a second (different) metric.

In some embodiments, the first metric and the second metric each comprise one or more factors relating to a radio characteristic of the connection. The radio characteristics relate to factors that can be measured relating to the wireless communication of the connection between the node and the connected one of the one or more donor nodes of the wireless network. The characteristics therefore relate to physical qualities of the wireless connection. For example, these may be related to the signal strength, or the amount of noise received.

In some embodiments, a factor of the second metric comprises a radio characteristic of a given donor node; and a factor of the first metric comprises the radio characteristic of the given donor node compared to the radio characteristic of inter-frequency or co-channel neighbours of the given donor node. The comparison of a radio characteristic of a given donor node to the same radio characteristic of neighbours of the given donor node is often known as the dominance. For example, RSRP dominance could be the measure of the RSRP of a node, divided by the sum of the RSRP values of inter-frequency or co-channel neighbours of that node. Inter-frequency or co-channel neighbours are considered because these are neighbours that are most likely to interfere with transmissions to/from the node in question.

In some embodiments, the radio characteristic is established by performing an aggregation function over a predetermined period of time. An aggregation function is used to combine a number of data points into a single value. For example, the aggregation function could be an average, a floating average, a windowed average, a maximum value, a minimum value, or a mode, or any other such function that will be known to the skilled person. By using an aggregation function over a predetermined period of time, it is possible to better respond to anomalous results that may be obtained during a single measurement. Consequently, it is possible to obtain a better indication of the radio characteristic.

In some embodiments, the predetermined period of time is larger when performing the fine-granularity scanning process than when performing the coarse-granularity scanning process. A longer period can be achieved during the fine-granularity scanning process because the connection is maintained during that time, as opposed to during the coarse-granularity scanning process. As an example, during the fine-granularity scanning process the aggregation function could be performed over one minute whereas during the coarse-granularity scanning process, the aggregation function could be performed over five seconds such that the scanning process is performed more quickly and a connection can be quickly formed. Larger values make it possible to "average out" anomalous results where the average connection quality is most relevant whereas smaller values can be used to exaggerate anomalous results, which may be useful when a consistent connection is desirable.

In some embodiments, at least one of the first metric and the second metric comprises at least one factor other than CINR or SINR. Carrier to Interference and Noise Ratio (CINR) and Signal to Interference and Noise Ratio (SINR) are two measurements that both emphasise the idea of measuring a desirable quality (the actual desirable signal) divided by an undesirable quality (i.e. noise). Such measurements can be useful in determining the quality of a connection. However, both of these measurements are limited in that they can significantly fluctuate due to changes in both load and environment. Such fluctuation may be problematic when performing a scanning process where values given by different nodes may significantly differ, these measurements are less useful when performing fine granularity scanning or optimisation because small improvements will be overshadowed by greater variants in the measured characteristic. This can lead to repeated instability in which the system continually chases an allegedly better configuration due to the fluctuations. Accordingly, although these radio characteristics need not be ruled out, it is often desirable to use a factor other than CINR or SINR.

In some embodiments, the first metric and the second metric each comprise at least a first factor based on RSRP. For example, in some embodiments, the first metric is based on RSRP dominance; and the second metric is based on RSRP. Reference Signal Received Power (RSRP) is a stable metric of signal strength. RSRP Dominance is a stable metric of interference and indicates the potential of achieving a maximum CINR/SINR.

In some embodiments, at least one of the first metric and the second metric comprises a factor based on at least one of SINR or spectral efficiency. Spectral efficiency (bandwidth efficiency) relates to the amount of data that can be transmitted over a given bandwidth. The spectral efficiency can therefore be measured in terms of bits per second per Hz. The spectral efficiency can also be mapped to SINR and the number of radio channel MIMO streams.

In some embodiments, factors making up at least one of the first metric and the second metric are normalised to within the range 0 to 1 to produce a set of normalised values. The normalisation may take place on the basis of the smallest anticipated value and the largest anticipated value such that a measurement between those two extremes can be mapped to between the range 0 and 1.

In some embodiments, the normalised values are weighted to produce a set of weighted normalised values, which are added together. Each of the normalised values may be weighted in order to reflect the fact that certain factors may be considered to be more important than other factors. A metric can then be produced on the basis of the sum of those weighted normalised values.

In some embodiments, the node comprises an antenna array comprising at least one antenna; and the at least one antenna is configurable to receive signals within a given angle of a given direction. The antenna may be directional such that it is capable of transmitting and/or receiving signals primarily in a single direction. In particular, the antenna may be such that it is capable if transmitting or receiving more efficiently in a particular direction. The direction may extend over a particular angle. For example, the direction may be defined by a particular direction having an angular spread.

In some embodiments, the given direction is changeable; and the configuration includes the given direction. There are a number of ways in which the given direction of the antenna may be changeable. For example, in some embodiments, the given direction is changeable by rotation of the at least one antenna. For example, a motor may be used in order to rotate the antenna. Meanwhile, in some embodiments, the given direction is changeable by electronically changing a pattern of the antenna. Of course, in some embodiments, the given direction could be changeable by either or both of a motor and electronically changing the antenna pattern.

In some embodiments, at each step of the coarse-granularity scanning process, the given direction is changed by an amount corresponding to the given angle. Since the coarse-granularity scanning process involves disconnection of any established connection to donor nodes, the coarse-granularity scanning process may be performed more quickly by changing the given direction by an amount equal to the receive angle of the antenna (e.g. the beam width). For example, if the antenna is configured to receive signals over a 15 degree angle, then during the coarse-granularity scanning process, the given direction will be changed by 15 degrees at each step. In this manner, over the course of the coarse-granularity scanning process, the antenna can be rotated so as to cover a full 360 degrees of rotation. Consequently, the antenna should be capable of receiving signals from any donor node that is present. It will be appreciated however, that during this coarse-granularity scanning process, the antenna may rarely be configured optimally to receive signals from any of those detected nodes. For example, a node that is at the edge of the given angle, for example, a node that is off by 14 degrees, could be receivable, but may not have a great as spectral efficiency as a node that directly faces the antenna.

In some embodiments, during the coarse-granularity scanning process, the given direction is changed to sweep a greater range than during the fine granularity scanning process. Consequently, during the fine granularity scanning process, the given direction may only sweep a small distance such as an establish connection can be maintained. This can therefore be used to establish the configuration in which the specific provided connection can be optimised or improved.

In some embodiments, during the coarse-granularity scanning process, the given direction is changed to sweep a range of substantially 360 degrees.

In some embodiments, during the fine granularity scanning process, the given direction is swept across an area corresponding to the given angle of the antenna array during the coarse-granularity scanning process. As previously discussed, the fine granularity scanning process can be used in order to refine an established connection. In this way, having determined a given angle of the antenna at which a connection to a donor node is possible, it may be desirable to slightly modify that given angle in order to improve the connection to that selected donor node. This can therefore be achieved by altering the given direction so as to sweep an area corresponding to the given angle of the antenna array. For example, if the given angle of the antenna ray is 15 degrees such that the antenna is capable of receiving over an area of 15 degrees, then during the fine granularity scanning process, the given direction is swept across those 15 degrees to determine the exact configuration in which the previously established connection to that node may be refined.

In some embodiments, at each step of the fine granularity scanning process, the given direction is changed by a configurable amount. For example, in some embodiments, this could be less than two degrees. In other embodiments, it could be less than one degree.

In some embodiments, the node further comprises motor circuitry to rotate the antenna array to change the given direction; and at each step of the fine granularity scanning process, the given direction is changed by an amount equal to a step size of the motor circuitry. The antenna can be rotated by using a motor. However, the motors are typically limited in terms of its step size, i.e. the minimum amount that the motor can be rotated during a single step. Accordingly, at each step of the fine granularity scanning process, the given direction may be changed by an amount corresponding to that step size.

In some embodiments, during the fine granularity scanning process, the given direction is initially changed by electronically changing a receiver pattern of the antenna and subsequently changed, in dependence on said metric, by rotating the antenna array. Operating a motor can be energy intensive. In particular, operating a motor can be more energy intensive than electronically changing a receive pattern of an antenna. Consequently, rather than operating the motor in order to alter the given direction, it may be desirable to initially electronically change a receiver pattern of the antenna array. The metric can then be monitored in order to determine whether it increases or decreases as a consequence of the changed receiver pattern. If the metric shows an improvement, then it can be suggested that the given direction is preferable and could result in a refinement in the established connection. This can then be confirmed by physically rotating the antenna array using the motor. Consequently, the use of the energetically expensive motor can be limited to cases where an improvement would be perceived.

In some embodiments, the fine granularity scanning process is repeated a plurality of times. In particular, a node according to any preceding claim, wherein the fine granularity scanning process is repeated until one of a plurality of conditions has been met. In this way, the fine granularity scanning process may be used as an ongoing scanning process in order to react to changes in the environment. Alternatively, the fine granularity scanning process could be repeated in order to take into account a large number of circumstances over a period of time. For example, if the fine granularity scanning process operates over a number of hours, then the scanning process may be subjected to and may therefore take into account time dependent situations may affect the connection quality. For example, this may include factors such as usage patterns and changes in the environment.

In some embodiments, the plurality of conditions comprises a condition relating to the period for which the fine granularity scanning process has run. In other words, the fine granularity scanning process could repeat until a period of time has elapsed.

In some embodiments, the plurality of conditions comprises a condition relating to a change in the metric. For example, in some embodiments, the condition relating to a change in the metric is met if a difference in the metric between a previous performance of the fine granularity scanning process and a subsequent performance of the fine granularity scanning process is less than a threshold value. Consequently, if repeated performances of the fine granularity scanning process are found to produce very little refinement, then the fine granularity scanning process may be stopped.

In some embodiments, the fine granularity scanning process is restarted in response to one of a plurality of further conditions being met. Consequently, by having stopped the fine granularity scanning process, the fine granularity scanning process may be restarted under particular conditions. For example, even if it has been determined that previously the fine granularity scanning process was producing little further refinement, then if the measured metric were suddenly to drop, then the fine granularity scanning process could be repeated again. This could represent a situation, for example, in which an obstruction was temporality placed in front of the antenna causing its given direction to be refined slightly to get around the obstruction. In some embodiments, the plurality of further conditions comprises a condition relating to the metric falling below a threshold value.

In some embodiments, the connection circuitry is to determine an initial configuration to form the connection to the selected donor node in the one or more donor nodes; and the connection circuitry is to determine the initial configuration using a third metric. Having selected a donor node, an initial configuration (e.g. a rotation) of the antenna is chosen in order to access that donor none. This is still carried out at a coarse-granularity and could, in some embodiments, be achieved by rotating the antenna a second time. In some other embodiments, a further rotation of the antenna is not necessary and values determined during the first initial rotation can be used to determine an angle at which the selected node can be accessed. There are a variety of options available for the third metric. However, in some embodiments, the third metric and the second metric are the same. The metric could therefore be the same as the metric used in the fine-granularity scanning process.

Particular embodiments will now be described with reference to the figures.

FIG. 1 illustrates a wireless network 100 comprising a number of donor nodes 110a-110g. The donor nodes 110a-110g are connected to a network and thus can wirelessly provide access to a node 120. The donor nodes 110a-110g are scattered around such that regardless of the environment or obstacles, it is generally possible for the node 120 to establish a connection to at least one of the donor nodes 110a-110g. The node 120 itself also establishes wireless connections to items of end-user equipment 130 such as mobile devices such as computers etc. Once the node has established a connection to one of the donor nodes 110a-110g, however, it is desirable for that connection to be refined in order to improve spectral efficiency, reduce lost packets, and/or improve a data rate between the node 120 and the selection donor node 110a-110g.

Figure 2:
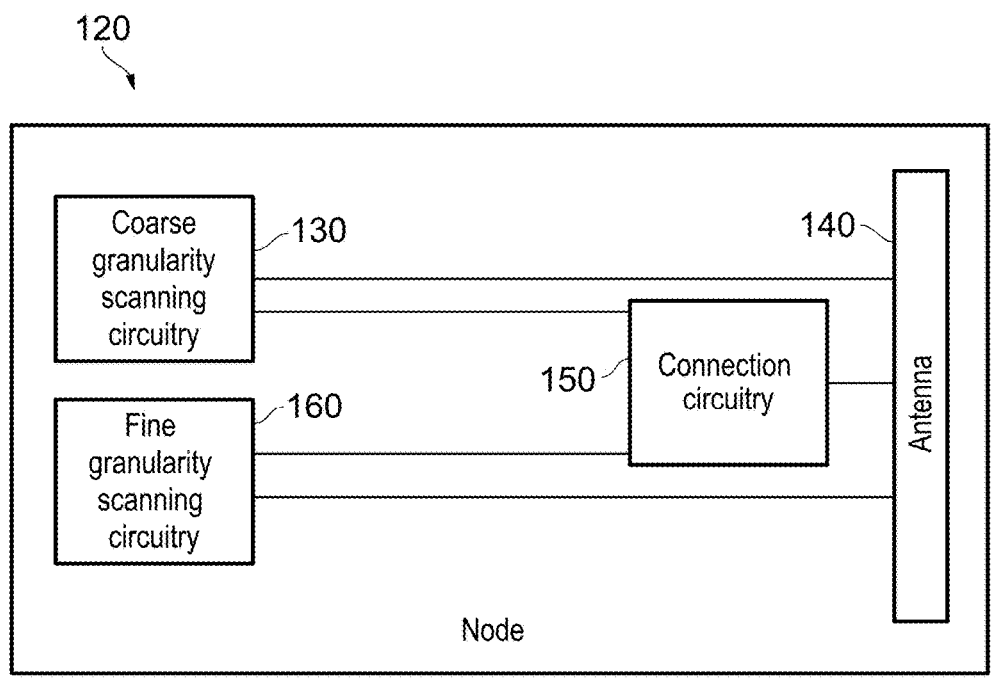

FIG. 2 schematically illustrates the node 120 in more detail. The node includes an antenna array 140 comprising at least one antenna. Using coarse-granularity scanning circuitry 130, a coarse-grained scanning process is performed using the antenna array 140 to search for available donor nodes 110a-110g that can be accessed from the current location of the node 120. During the coarse-granularity scanning process, any established connections to donor nodes 110a-110g may be broken. The coarse-granularity scanning process is therefore performed quickly (e.g. over a minute) and without particular concern for optimising or refining any formed connections. Once one of the detected donor nodes 110a-110g has been selected, the connection circuitry 150 forms a connection to that selected donor node 110a.

Having formed a connection to a selected donor node 110a, a fine-grained scanning process can be performed using fine granularity scanning circuitry 160. During the fine-grained scanning process, the connection that has been formed by the connection circuitry 150 to the selected donor node 110a is refined thereby potentially improving the connection to allow improved data rates, fewer last packets, etc.

Note that the metric used in a fine-grained scanning process (e.g. when performing fine alignment) is of particular importance. Certain common metrics such as SINR or CINR can be useful. However, they tend to fluctuate quite significantly. Accordingly, the improvement in connection that is gained during the fine-grained scanning process can be smaller than the level of fluctuation of the SINR or CINR metric. Thus, any improvement can be hard or even impossible to determine. As a consequence of this, the situation can arise in which "thrashing" occurs, since a potentially better antenna position can always be seen (if not achieved). The antenna could then end up oscillating between multiple positions. Hence these metrics, on their own, although useful, are limited. For this reason, in some embodiments, the metric used for fine-alignment is RSRP.

Figure 3:
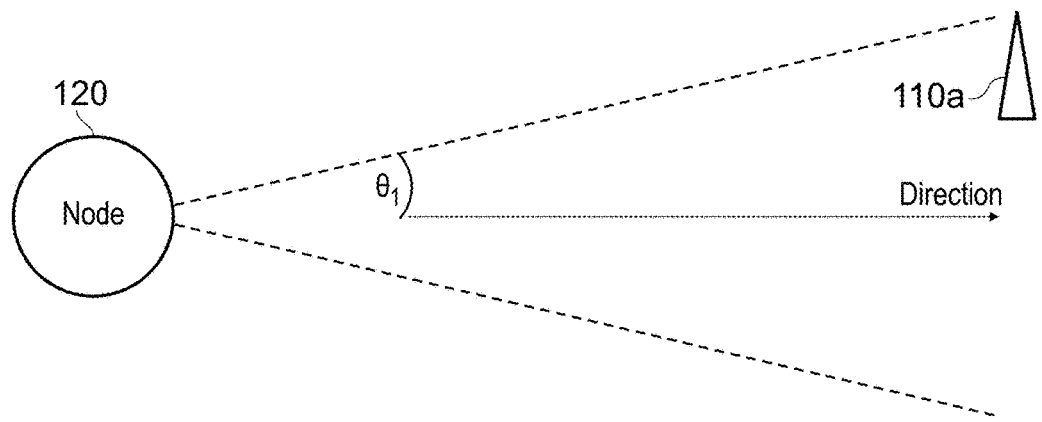
FIG. 3 illustrates an example node that utilises a directional antenna in accordance with some embodiments.

FIG. 3 illustrates an example node that utilises a directional antenna. The directional antenna has a particular given beam direction, as well as a beam angle ($\theta_1$). The directional antenna is especially good at receiving and/or transmitting signals within the beam's area. However, it is significantly worse (and could even be incapable) of receiving and/or transmitting signals outside that area. During the coarse-grain scanning process, the antenna is rotated through substantially 360 degrees in blocks of $\theta_1$ degrees. At each position, the node 120 scans for available donor nodes 110a-110g. Since the beam angle matches the rotation step size, each donor node 110a-110g that is reachable by the node 120 should be detected by the node 120 one or more times, obstacles and environmental conditions notwithstanding. However, as shown in FIG. 3, it is possible that the node's antenna does not face the donor node 110a. In this case, although it might be expected that the donor node 110a will be detected, it is possible that its sub-optimal position could lead to a poor data rate being achieved between the node 120 and the donor node 110a. Hence, if the donor node 110a becomes the selected donor node, it is possible that further refinement could be performed in order to obtain a better quality connection.

Figure 4:
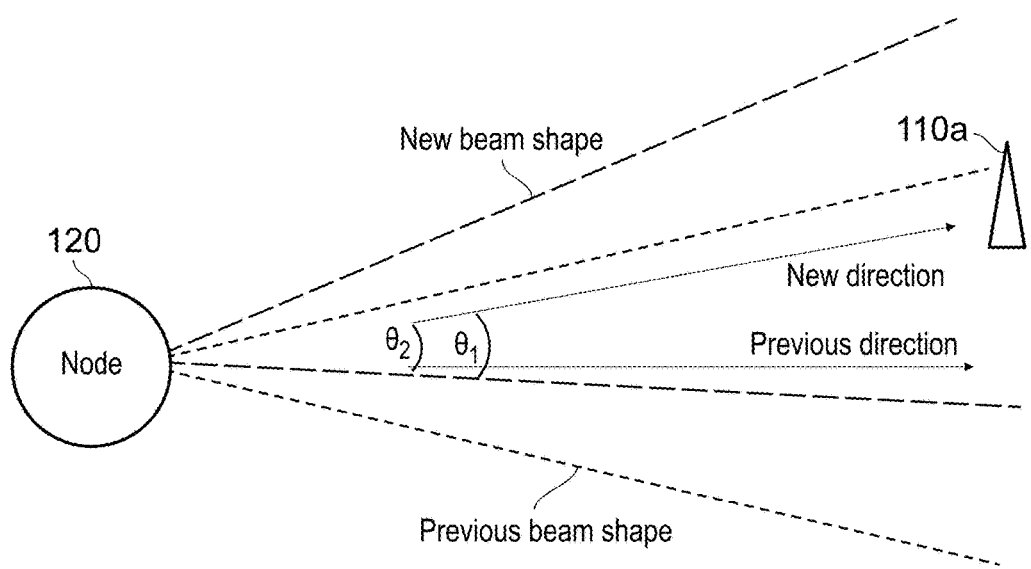
FIG. 4 illustrates the fine-grained scanning process in accordance with some embodiments.

FIG. 4 illustrates how the fine-grained scanning process can be used to improve the connection between the node 120 and a donor node 110a. In this example, it is shown how the antenna has rotated through $\theta_2$ degrees from a previous position to a new position. It will be appreciated that in this embodiment, the angle $\theta_2$ is less than the angle $\theta_1$. In other words, the antenna direction is changed to scan within one of the previously discussed steps using during the coarse-grained scanning process. For example, if the angle $\theta_1$ was 15 degrees, then during the coarse-grained scanning process, the antenna would be rotated in steps of 15 degrees. It may then be determined that a connection should be formed with the donor node 110a by turning the antenna to an angle of 345 degrees, thereby covering the range 330 degrees to 360 degrees. During the fine-grained scanning process, the antenna direction can then be swept through the range of 345 degrees to 360 degrees at smaller increments (e.g. two or even one degree at a time). In practice, the size of the smaller increment may be dependent on the size of the motor that rotates the antenna. At each step, a metric can be used to assess the quality of the connection to the donor node 110a to determine whether or not the revised antenna position has resulted in a better connection or not. Note that since the donor node 110a remains within the antenna beam during the fine-grained scanning process, the connection to the donor node 110a from the node 120 can be maintained, unlike the case in the coarse-grained scanning process.

In some embodiments, rather than slowly sweeping over the area, a binary search can be performed in order to, over a number of iterations, converge on the antenna direction that produces a good result for the selected donor node 110a. For example, when the fine-grained scanning process starts, the step size could initially be quite large. As the process continues, the step size can be reduced until a suitable angle for the antenna is determined. In some embodiments, the step size can be varied depending on how much the metric changes. For example, if the metric changes by a large amount in a given direction for a small step size, then the step size could be increased. If the metric starts to decrease then the step size could be lowered (and reversed).

Also, in some embodiments, the fine-grained scanning process might be performed multiple times. If this is the case then the node could avoid setting the antenna direction to angles for which the metric has already been measured, thereby avoiding multiple readings being made.

FIG. 5 shows a worked example of calculating DRM. DRM works by considering one or more independent metrics such as SINR, Spectral Efficiency (SE), and donor eNodeB RSRP dominance. The RSRP dominance is calculated by finding the power difference between a particular donor node and the sum of its neighbours powers and the RSRP detection noise floor. This difference is then converted into a dB value. The detection noise floor can be calculated using the method outlined in http://laroccasolutions.com/78-rsrp-and-rsrq-measurement-in-lte and is given by: KTB+NF where NF=7 dB being the noise figure for the communication system, K its Boltzmann's constant, T is the thermal noise floor, and B is 15 KHz being the bandwidth of a resource element.

As well as using the SINR/SE and RSRP dominance, it is also possible to incorporate a third metric such as downlink and uplink throughputs.

The metrics taken are aggregated over a period of time. For example, the SINR/SE/CINR/RSRP dominance values can be averaged (via a mean) every five seconds for one minute. This allows anomalies in the measurements to be evened out or exaggerated (if, for example, a connection were to be detected as being highly variable). A moving average can be calculated by the equation y[n]=alpha*x[n]+(1-alpha)*y[n−1]. This can be used to treat more recent values with a greater importance than older values (or vice-versa). The value of alpha can be determined by the equation:

$$\alpha = 1 - (1 - \text{settling\_level})^{\frac{1}{num\_samples}}$$

The number of samples (num_samples) is calculated by dividing the averaging period by the sampling resolution. For example, if samples are taken every five seconds for one minute, then 20 samples are taken. The settling level (settling_level) is the filter output level after num_samples for a step input.

Each of these averaged metrics is then normalised to within a range of 0 to 1 based on maximum and minimum values of the metrics for the equipment being used. For example, for SINR, the minimum and maximum values could be −5 dB and 30 dB respectively. Meanwhile, the minimum and maximum values for RSRP dominance could be 0 and 35 (dBs) respectively.

The normalised values are then weighted by modifiers, again in the range 0 to 1 before being added together to form the DRM value. The modifiers can be configured depending on the network deployment strategy. In particular, the modifiers depend on whether the wireless network operator considers SINR/SE or RSRP dominance to be the more important metric. In the current embodiments, the weighting value attached to the RSRP dominance is equal to 1 minus the weighting value for the SINR/SE. This way, the DRM value will lie between 0 and 1. In the example of FIG. 5, the SINR weighting is 0.3 and the RSRP weighting is 0.7. Thus, RSRP is considered to be a more important factor than SINR.

Consequently, during the fine-grained scanning process, the DRM measurement can be determined, and the antenna direction where the highest DRM measurement is obtained for a given node is selected as the antenna direction to be used.

Note that a motor is not necessary in order to change the beam angle of a directional antenna. As an alternative, electronic beam steering can be used in order to alter the direction in which an antenna points. Typically, this is achieved by connecting different elements of a circuit so that the array is more sensitive to receiving communications from a particular direction and can transmit communications in a particular direction more strongly.

Figure 6:
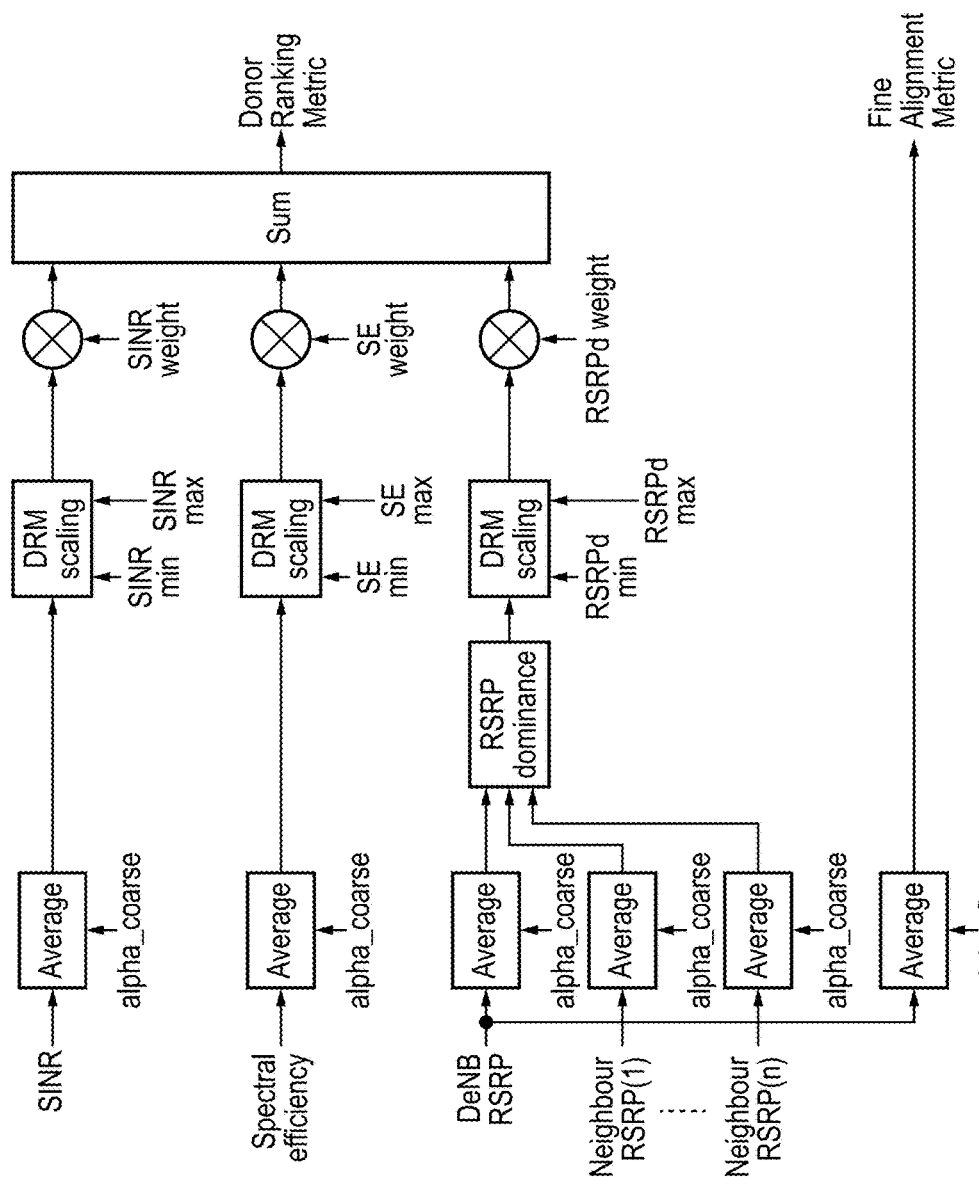
FIG. 6 shows a data flow in respect of calculating the fine and coarse grained alignment metrics in accordance with some embodiments.

FIG. 6 shows a data flow in respect of calculating the coarse-grained alignment metric and the fine-grained alignment metric according to some embodiments.

In respect of the fine alignment metric, this is produced by averaging the RSRP value over a period of time. The value alpha_fine relates to the alpha value for fine granularity. Typically, this will consider a larger number of samples than for coarse-granularity, since the fine granularity alignment does not necessitate breaking any existing connections. An example value for alpha_fine is 0.0883 assuming a 75% settling level, an averaging duration of 15 seconds and a one second sampling duration.

In respect of the coarse alignment metric, the DRM value is calculated. This is made up from three components in this embodiment. The first component first considers RSRP dominance, which is again made up from the RSRP value averaged over a period of time, as well as the RSRP values of neighbours of that node, again averaged over a period of time. The averaging period for coarse alignment (represented by alpha_coarse) is different compared to the averaging period for fine alignment. An example value for alpha_coarse is 0.2421 assuming a 75% settling level, an averaging duration of five seconds and a one second sampling duration. Having calculated the dominance value, this is normalised/scaled based on minimum and maximum values of RSRP dominance and then weighted. Similarly, spectral efficiency and SINR are both averaged over a period of time (represented by alpha_coarse) and normalised/scaled based on minimum and maximum values of spectral efficiency/SINR respectively. These values are then each weighted. The weighted, normalised values of SINR, Spectral Efficiency, and RSRP dominance are then added together to form DRM, which is the coarse-grained metric.

Figure 7:
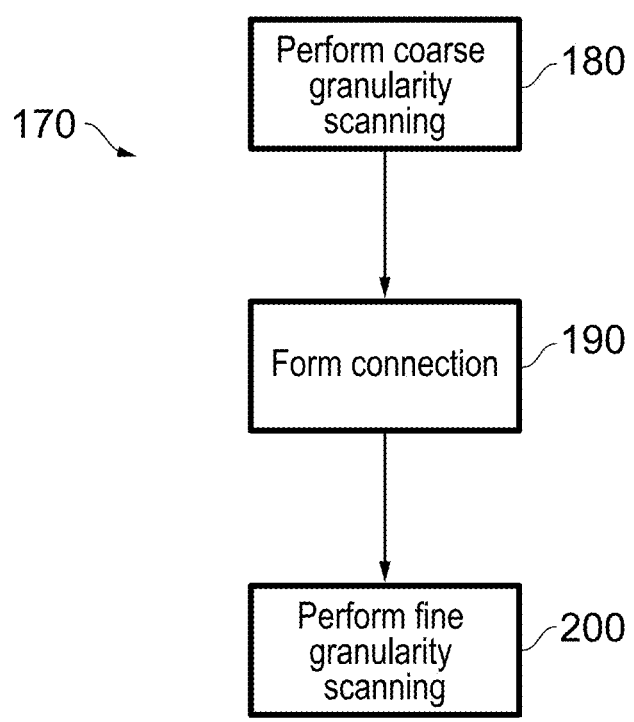
FIG. 7 illustrates a flow chart in accordance with some embodiments.

FIG. 7 illustrates a flow chart 170 in accordance with some embodiments. At a step 180, a coarse-granularity scanning process is performed. This can result in any formed connections being broken. At a step 190, on the basis of the coarse-granularity scanning process, a connection to one of the detected nodes can be formed. Finally, at step 200, a fine granularity scanning process can be performed in order to refine the connection to a selected one of the detected nodes. The fine granularity scanning process is such that the connection formed in step 190 is not broken during the scanning process.

Figure 8:
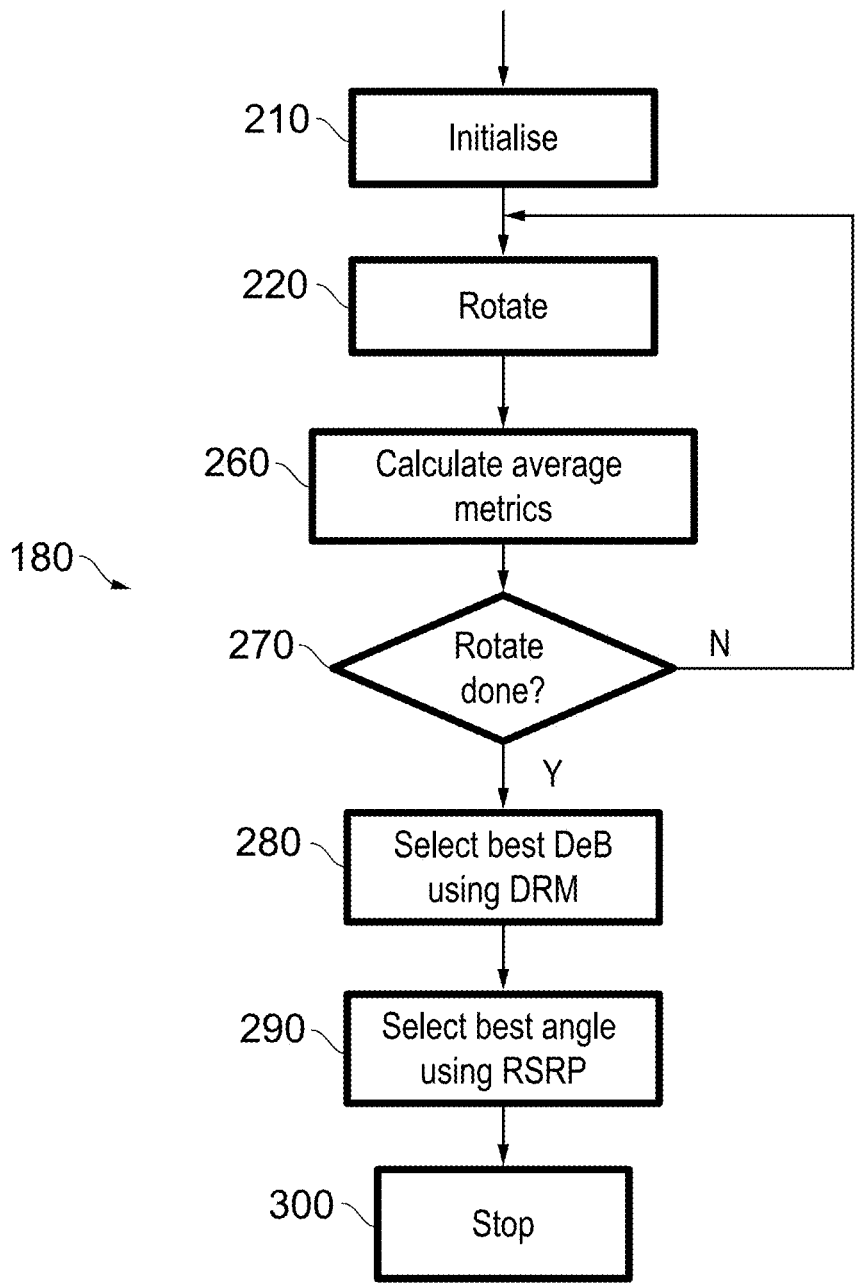
FIG. 8 illustrates a flow chart showing coarse-grain alignment in accordance with some embodiments.

FIG. 8 illustrates a flow chart 180 in accordance with some embodiments. The flow chart 180 illustrates the process of the coarse-grained scanning process. At a step 210, the process is initialised. This can involve resetting the radio and/or removing temporarily stored values in respect of radio characteristics that have already been determined. This process also involves breaking any existing radio connections so that the scanning process is not affected by any existing radio connection. At a step 220, the antenna is rotated. Generally, the rotation steps will be larger for the coarse-grained scanning process than for the (later discussed) fine-grained scanning process. There may also be a relationship between the radio antenna angle and the rotation angle such that the rotation is achieved in a small number of distinct steps. Then, at step 260, the average DRM and RSRP values are determined over a period of time. Since the coarse-grained scanning process is to be performed quickly, this period of time will be much smaller than for the fine-grained scanning process. For example, the average could be determined over five seconds. Step 270 then determines whether or not the full range of rotation has been met. If not, then the process returns to step 220. Otherwise, at step 280, the selected donor node is determined based on the highest value of DRM that has been determined for each donor node during the coarse-grained scanning process. Having selected a donor node, a suitable angle of the antenna for accessing that donor node is then determined at step 290. This is determined using, for example RSRP. This determination is made at a coarse-grained level. Finally, the coarse-grained scanning process ends at step 300.

Figure 9:
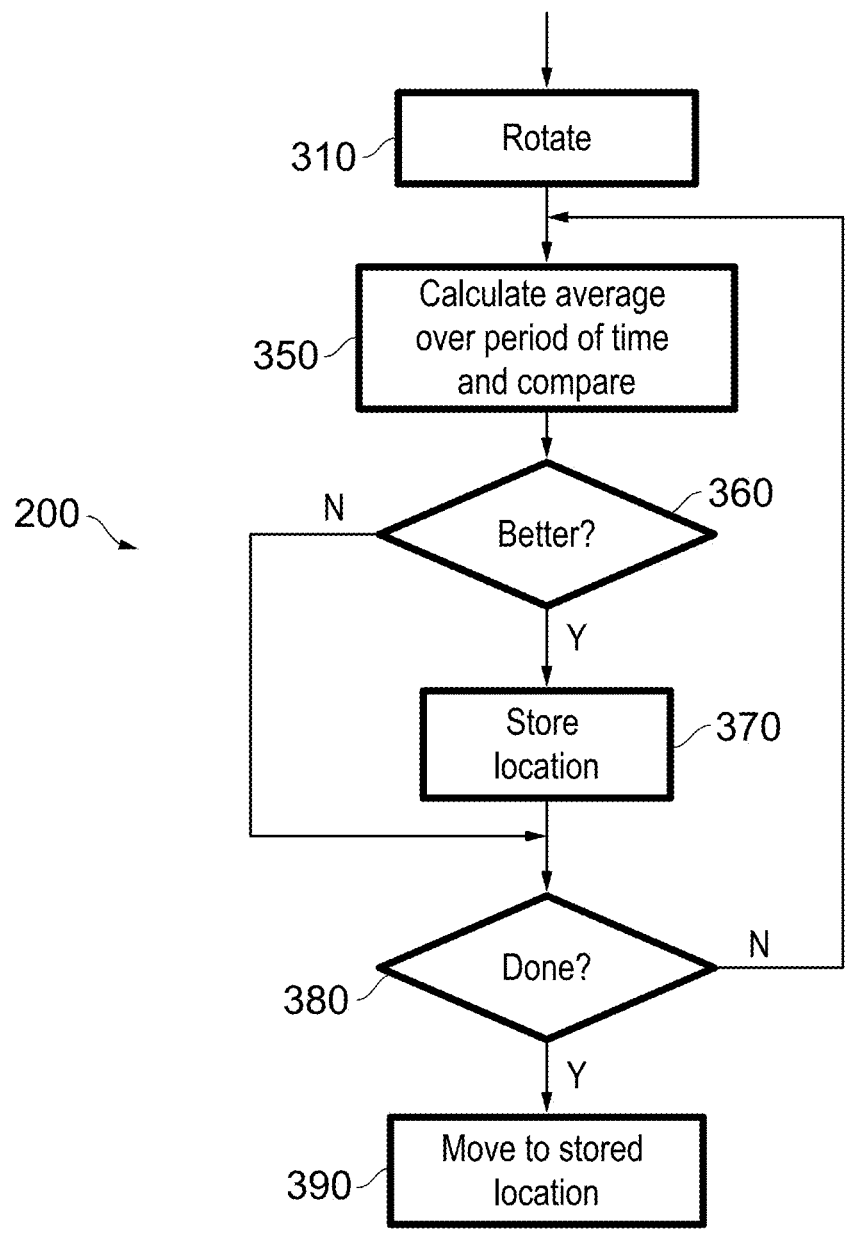
FIG. 9 illustrates a flow chart showing fine-grain alignment in accordance with some embodiments.

FIG. 9 illustrates a flow chart 200 in accordance with some embodiments. The flow chart 200 illustrates the process of the fine-grained scanning process. At a step 310, the antenna direction is rotated. Typically, this will occur by the step amount (such as one or two degrees). If the antenna direction is already at an extreme, then the antenna rotation direction could be reversed or the antenna direction could be rotated back to its initial value. At step 350, the reading is averaged over a period of time and the RSRP value is recorded. This is then compared to other antenna directions for which an average RSRP metric has been calculated in step 360. If it is determined that this metric is an improvement, then the RSRP value is stored, together with the antenna direction, at step 370. Otherwise, and in any event, at step 380 it is determined whether the fine-grained scanning process is complete. This might occur, for instance, after a period of time has elapsed, in order to prevent the motor from running out or to prevent excessive energy being expended in rotating the antenna. This conclusion could also be reached if, for example, the improvement in RSRP falls below some threshold value such that there are diminishing returns from continuing to perform fine-grained scanning. If it is determined that the fine-grained scanning process is complete, then at step 390 the antenna is rotated to the stored location (i.e. the location from which the best RSRP value is obtained). Otherwise, the process returns to step 310 where the process continues. It should be noted that once the final rotation has occurred, one or more further conditions could be met that causes the fine-grained scanning process to restart. For example, if connection were to suddenly drop then either the fine-grained scanning process or the coarse-grained scanning process could restart.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A node configured to operate in a wireless network, comprising:
coarse-granularity scanning circuitry to perform a coarse-granularity scanning process to (i) break existing connections to nodes of the wireless network and then (ii) detect one or more donor nodes of the wireless network according to a first metric;
connection circuitry to form a connection to a selected donor node in the one or more donor nodes; and
fine granularity scanning circuitry to perform a fine granularity scanning process to determine a configuration in which a quality of the connection is improved according to a second metric, wherein the connection is maintained during the fine granularity scanning process.

2. A node according to claim 1, wherein
the first metric and the second metric each comprise one or more factors relating to a radio characteristic of the connection.

3. A node according to claim 2, wherein
a factor of the second metric comprises the radio characteristic of a given donor node; and
a factor of the first metric comprises the radio characteristic of the given donor node compared to the radio characteristic of inter-frequency or co-channel neighbours of the given donor node.

4. A node according to claim 2, wherein
the radio characteristic is established by performing an aggregation function over a predetermined period of time.

5. A node according to claim 4, wherein
the predetermined period of time is larger when performing the fine granularity scanning process than when performing the coarse-granularity scanning process.

6. A node according to claim 1, wherein
at least one of the first metric and the second metric comprises at least one factor other than Carrier to Interference and Noise Ratio (CINR) or Signal to Interference and Noise Ratio (SINR).

7. A node according to claim 1, wherein
the first metric and the second metric each comprise at least a first factor based on Reference Signal Received Power (RSRP).

8. A node according to claim 1, wherein
the first metric is based on Reference Signal Received Power (RSRP) dominance; and
the second metric is based on RSRP.

9. A node according to claim 1, wherein
at least one of the first metric and the second metric comprises a factor based on at least one of Signal to Interference and Noise Ratio (SINR) or spectral efficiency.

10. A node according to claim 1, wherein
factors making up at least one of the first metric and the second metric are normalised to within the range 0 to 1 to produce a set of normalised values.

11. A node according to claim 10, wherein
the normalised values are weighted to produce a set of weighted normalised values, which are added together.

12. A node according to claim 1, wherein
the node comprises an antenna array comprising at least one antenna; and
the at least one antenna is configurable to receive signals within a given angle of a given direction.

13. A node according to claim 12, wherein
the given direction is changeable; and
the configuration includes the given direction.

14. A node according to claim 13, wherein
the given direction is changeable by rotation of the at least one antenna.

15. A node according to claim 13, wherein
the given direction is changeable by electronically changing a receiver pattern of the antenna.

16. A node according to claim 13, wherein
at each step of the coarse-granularity scanning process, the given direction is changed by an amount corresponding to the given angle.

17. A node according to claim 13, wherein
during the coarse-granularity scanning process, the given direction is changed to sweep a greater range than during the fine granularity scanning process.

18. A node according to claim 13, wherein
during the coarse-granularity scanning process, the given direction is changed to sweep a range of substantially 360 degrees.

19. A node according to claim 13, wherein
during the fine granularity scanning process, the given direction is swept across an area corresponding to the given angle of the antenna array during the coarse-granularity scanning process.

20. A node according to claim 13, wherein
at each step of the fine granularity scanning process, the given direction is changed by a configurable amount.

21. A node according to claim 13, wherein
the node further comprises motor circuitry to rotate the antenna array to change the given direction; and
at each step of the fine granularity scanning process, the given direction is changed by an amount equal to a step size of the motor circuitry.

22. A node according to claim 13, wherein
during the fine granularity scanning process, the given direction is initially changed by electronically changing a receiver pattern of the antenna and subsequently changed, in dependence on a metric, by rotating the antenna array.

23. A node according to claim 1, wherein
the fine granularity scanning process is repeated a plurality of times.

24. A node according to claim 1, wherein
the fine granularity scanning process is repeated until one of a plurality of conditions has been met.

25. A node according to claim 24, wherein
the plurality of conditions comprises a condition relating to a period for which the fine granularity scanning process has run.

26. A node according to claim 24, wherein
the plurality of conditions comprises a condition relating to a change in a metric.

27. A node according to claim 26, wherein
the condition relating to a change in the metric is met if a difference in the metric between a previous performance of the fine granularity scanning process and a subsequent performance of the fine granularity scanning process is less than a threshold value.

28. A node according to claim 24, wherein
the fine granularity scanning process is restarted in response to one of a plurality of further conditions being met.

29. A node according to claim 28, wherein
the plurality of further conditions comprises a condition relating to the metric falling below a threshold value.

30. A node according to claim 1, wherein
the connection circuitry is to determine an initial configuration to form the connection to the selected donor node in the one or more donor nodes; and
the connection circuitry is to determine the initial configuration using a third metric.

31. A node according to claim 30, wherein
the third metric and the second metric are the same.

32. A method of operating a node in a wireless network, comprising:
performing a coarse-granularity scanning process to (i) break existing connections to nodes of the wireless network and then (ii) detect one or more donor nodes of the wireless network according to a first metric;
forming a connection to a selected donor node in the one or more donor nodes; and
performing a fine granularity scanning process to determine a configuration in which a quality of the connection is improved according to a second metric, wherein the connection is maintained during the fine granularity scanning process.

33. A node configured to operate in a wireless network, comprising:
means for performing a coarse-granularity scanning process to (i) break existing connections to nodes of the wireless network and then (ii) detect one or more donor nodes of the wireless network according to a first metric;
means for forming a connection to a selected donor node in the one or more donor nodes; and
means for performing a fine granularity scanning process to determine a configuration in which a quality of the connection is improved according to a second metric, wherein the connection is maintained during the fine granularity scanning process.

* * * * *